United States Patent [19]

Gyugyi

[11] 3,858,105

[45] Dec. 31, 1974

[54] STATIC POWER CONVERSION ARRANGEMENT AND METHOD

[75] Inventor: Laszlo Gyugyi, Pittsburgh, Pa.

[73] Assignee: Westinghouse Electric Corporation, Pittsburgh, Pa.

[22] Filed: July 18, 1973

[21] Appl. No.: 380,328

[52] U.S. Cl................. 321/27 R, 321/66, 323/123, 323/124
[51] Int. Cl......................... H02m 5/04, G05f 5/00
[58] Field of Search............. 321/5, 27 R, 69 R, 66; 323/104, 119, 123, 124

[56] References Cited
UNITED STATES PATENTS

| | | | |
|---|---|---|---|
| 3,678,367 | 7/1972 | McMurray | 321/69 X |
| 3,707,668 | 12/1972 | Johnston | 321/27 R X |
| 3,742,336 | 6/1973 | Bedford | 321/69 R |
| 3,768,001 | 10/1973 | Thorborg | 321/27 R |
| 3,781,635 | 12/1973 | Saver | 321/27 R X |

Primary Examiner—William H. Beha, Jr.
Attorney, Agent, or Firm—J. J. Wood

[57] ABSTRACT

In order to minimize variations in the reactive current supplied by a reactive power source that provides the input voltages for a static power conversion system, without providing any real power, a multiplicity of converters are controlled to produce output currents that combine to give the desired total reactive output current, while maintaining the reactive input current drawn from the reactive power source substantially constant. In one version, a pair of converters are arranged to have opposing input power factors so that the reactive input currents cancel, and, therefore, obviate the necessity of the reactive power source supplying any reactive power at the fundamental frequency. In another version, a pair of converters have the same input power factor but the reactive output currents are added and subtracted in such a fashion as to minimize variations in the reactive input current drawn from the reactive power source. The principles involved in both these versions may be utilized either to provide reactive power to an alternating current system or to transmit power from one electrical system to another.

22 Claims, 16 Drawing Figures

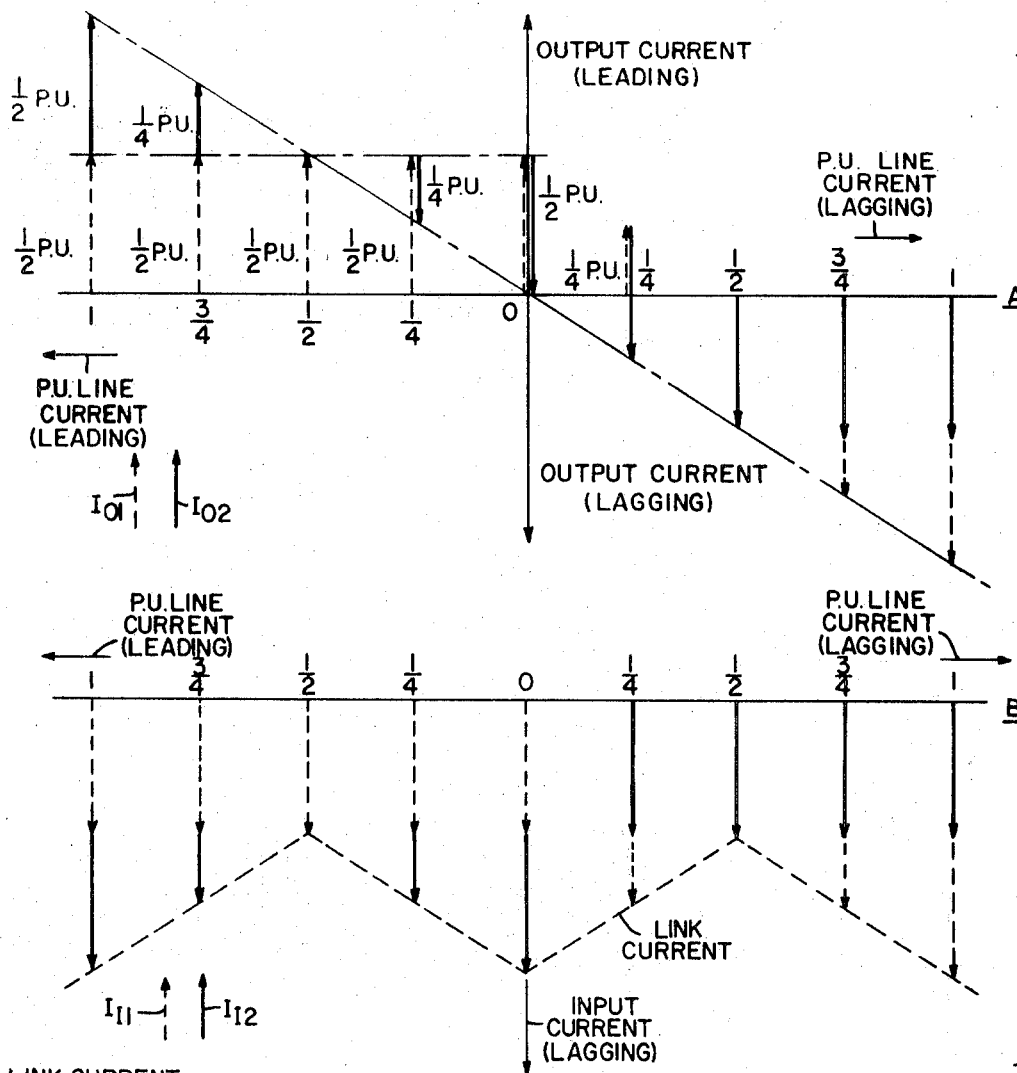
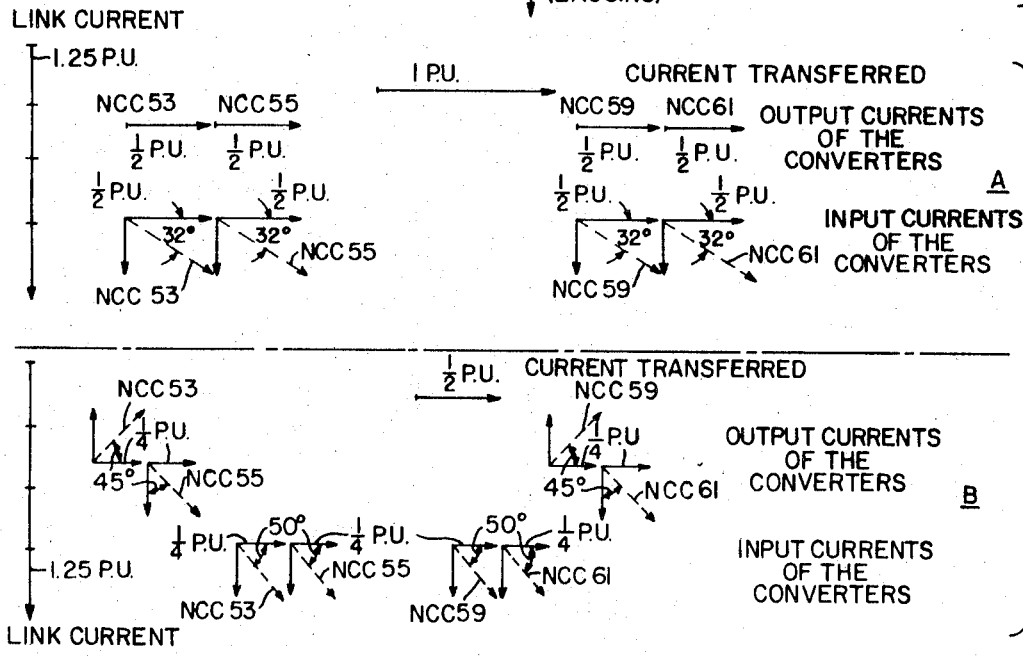

STATIC POWER CONVERSION ARRANGEMENT AND METHOD

BACKGROUND OF THE INVENTION

1. Field of the Invention

This invention relates generally to the static conversion of electrical power, and more specifically, this invention relates to a system for minimizing variations in the reactive power provided by a relatively high frequency link that provides input voltages, without supplying any real power, to a converter arrangement.

2. Description of the Prior Art

In an application filed by B. R. Pelly on Apr. 10, 1973, U.S. Ser. No. 349,884, entitled "Static Conversion System Employing High Frequency Link" and assigned to the same assignee as the present invention, there is disclosed an arrangement for operating a converter system with an input voltage provided by a source that is not required to supply any real power to the system. This "high frequency link" arrangement has a number of desirable performance characteristics, such as virtually distortion-free input/output current, controllable input/output power factor, etc. In addition, the high frequency link generator approach has a significant practical advantage in that the static switches (thyristors) employed in the frequency converters are not directly connected to the AC (alternating current) power system, and thus are not subject to line voltage transients. The "input voltage" for the converters is provided by the high frequency link generator, the magnitude of the "input voltage" being controlled either internally (i.e., by the converters themselves — "self excited" operation) or externally (i.e., by some external means — "externally excited" operation). In either event, the "input voltage" applied to the converter thyristors is free and independent of line transients and faults that may occur in connection with the AC power supply. This property of the high frequency link system is economically quite significant, making it possible to eliminate the usual large voltage safety margins (150–200 percent increase over the nominal voltage rating) used in the design of conventional static converter equipment. As a result, nearly full use is made of the power handling capacity of the thyristors.

In spite of the many advantages of the high frequency link approach, there are some factors which presently prevent this arrangement from realizing the full potential that is made available by this novel approach. This is especially true with respect to the situation where a passive high frequency link generator (such as an inductive-capacitive tuned circuit) is utilized. These problems primarily occur as a result of the lagging input power factor exhibited by a naturally commutated converter of the type utilized in the above-identified Pelly application.

A first undesirable aspect involves the effect of the laggin input power factor on the frequency of a passive high frequency link generator. The lagging input power factor of a naturally commutated converter has a value which is a function of the load power factor and the output voltage reduction factor ($V_0/V_{0max}$). In the original scheme disclosed in the Pelly application, the lagging quadrature component of the converter input current is supplied by the high frequency link. Since this quadrature current lags the link voltage by 90°, and since its magnitude under normal operating conditions varies between zero and a maximum value, it represents a loading effect on the high frequency link tuned circuit similar to that of a variable inductor. Therefore, under normal operating conditions, the frequency of the high frequency link generator may vary over a wide range, unless the VAR (volt-ampere reactive) rating of the tuned LC (inductive-capacitive) circuit is considerably higher than that required by the static converters. The varying reactive high frequency link current thus leads to the practical problem of compromising between the increased cost due to increased VAR rating of the high frequency link and increased distortion in the terminal voltages and currents (occurring at the minimum link frequency) and increased switching and suppression circuit losses (occurring at the maximum link frequency) due to the variable link frequency.

Another aspect of the problem created by the inherently lagging input power factor from a naturally commutated converter is that the high frequency link generator must have a relatively large VAR rating, even if an active high frequency generator is used at a fixed link frequency (i.e., the variable frequency problem discussed in the preceding paragraph is not involved). It is generally accepted that this is the price that must be paid for achieving the advantages that accompany the utilization of naturally commutated converter circuits. However, there are some applications where the advantages of natural commutation are less significant than the economical advantages and improved technical performance that can be achieved by minimizing variations in the reactive current supplied by the high frequency link generator.

SUMMARY OF THE INVENTION

In order to further improve the performance of the original high frequency link generator concept, and to obviate the difficulties occasioned by the lagging input power factor of the naturally commutated cycloconverters utilized in that concept, the present invention relates to arrangements and methods of minimizing variations in the reactive current provided by the high frequency link generator. The high frequency link generator may be any reactive power source, but especially pertinent to this invention is the passive source, such as a tuned LC circuit. In a first embodiment, a source of reactive power (VAR) for an AC (alternating current) supply is achieved by connecting a force commutated cycloconverter in parallel with a naturally commutated cycloconverter between the reactive power source and the AC supply. The force commutated cycloconverter is set to have a leading input power factor of the same magnitude as the lagging input power factor of a naturally commutated cycloconverter (i.e., the phase angle of the reactive current drawn by the force commutated cycloconverter is opposite to the phase angle of the reactive current drawn by the naturally commutated cycloconverter). Control means are utilized to adjust the output currents of the cycloconverters in such a fashion as to minimize variations in the reactive current drawn from the reactive power source. In this particular embodiment, the cycloconverters are controlled to each provide one half of the required output reactive power, thus causing the reactive input current to the cycloconverters to have the same magnitudes. As a result of the opposite phases of the equal magnitude currents, they cancel, so that the reactive power source need not supply any reactive power at the fundamental frequency. By attaching the output of one of the cycloconverters to a second AC system, a tie or power transmitting arrangement such as disclosed in the Pelly application may be achieved. Of course, for this application the converters need not be cycloconverters but may be any appropriate type of converter. Thus, the arrangement could be utilized to tie a DC (direct current) system to a DC system or a DC system to an AC system, as well as to tie an AC system to an AC system.

With this arrangement, the decrease in the rating required for the reactive power source is dramatic. Since the quadrature currents drawn by the two converters cancel, and since the reactive power source does not supply real power (i.e., current in phase with the voltage), there is theoretically no fundamental frequency current (i.e., current having the link or reactive pwoer source frequency) required of the reactive power source. The reactive power source, therefore, must provide only the harmonic VAR demand of the converter. The significance of this factor may be realized by calculating the required rating of the reactive power source in the system of this applicaton, as compared to the rating requirements in the prior art system. Calculations show that in the original arrangement disclosed in the Pelly application an active high frequency link generator (i.e., a fixed frequency rotating machine or synchronous capacitor) should be rated for about 1.84 times the power transferred between the two electrical systems being tied. If a passive tuned LC circuit is used for the high frequency link, then, in order to keep the link frequency variation within practical limits (about 1:1.5), the rating of the link has to be increased to about 3.4 times that of the actual power transferred through the system. In the arrangement of this application, on the other hand, the high frequency link should only be rated to about 10 percent to 25 percent of the actual power handled by the system. (The actual rating is dependent upon the link frequency and the pulse number of the converters.) This means that the arrangement of this application would work with a passive high frequency link generator having only about 3 percent to 7.5 percent of the rating required for the system disclosed in the Pelly application. Therefore, the present applicaiton discloses an arrangement whereby the rating of the high frequency link generator may be greatly reduced and yet the link frequency remains constant even when a passive tuned circuit is utilized, (i.e., cancellation of the input quadrature or reactive currents of the converters results in no reactive loading effect on the high frequency li  ' enerator). An additional advantage of this embodiment is that the passive tuned LC circuit can be energized initially by the force commutated converter, so that the system is completely self sufficient. With naturally commutated converters, which rely on the input voltage for commutation, there can be no commutation or initiation of operation until a voltage is produced by the high frequency link generator. This means that an initial pulse of energy must be supplied to the high frequency link generator when only naturally commutated converters are utilized. It should also be noted that when this embodiment is utilized to supply reactive power, each of the converters need only convey half of the total power, and thus the ratings of the converters may be reduced.

By utilizing this embodiment of the invention, there are a number of advantages that may be realized for a static power conversion arrangement utilizing a high frequency link generator. The more significant of these advantages are: (1) currents having a very accurate sinusoidal waveshape can be generated even with converters having relatively low pulse numbers; (2) the converters are isolated from transients associated with the power supply and therefore the ratings of the converters can be substantially less than those of static systems which operate directly from the power supply; (3) the rating of the high frequency link generator (reactive power source) is only a small fraction of the reactive power provided for the power supply; (4) the frequency of the high frequency link generator is naturally constant, which provides uniform performances (e.g., fixed harmonics) under all operating (load conditions, as well as simple and reliable control for the system; and (5) the output voltage can be simply controlled by making the link voltage increase or decrease, which is effected by supplying real (positive or negative) power to the LC tuned circuit from a power supply. (This can be simply achieved by making a slight phase shift between the output voltage of the converters and the respective alternating current line or supply voltage.) The voltage control scheme employed also ensures that the firing of the thyristors takes place essentially at equal time intervals, making it possible to employ a relatively simple commutating circuit in the force commutated converter.

In another embodiment of this invention utilized for supplying reactive power to an alternating current system, two naturally commutated cycloconverters are connected in parallel between the reactive power source (high frequency link generator) and the alternating current system. In this embodiment, the input quadrature or reactive currents of the cycloconverters are, of course, both lagging. However, the output reactive currents may be either lagging or leading, as required. Therefore, an appropriate control means may be utilized to add and subtract the output currents of the cycloconverters to maintain the reactive current drawn from the reactive power source substantially constant, although the load requirements vary over a considerable range. As in the case of the first embodiment, a tie or power transmission arrangement may be formulated by placing another set of the parallel connected naturally commutated converters between the reactive power source and another electrical system. Also, as indicated before, the system is not restricted to the tying of one AC system to another, but may also be utilized to tie a DC system to a DC system or a DC system to an AC system.

One of the advantages of this arrangement is that only naturally commutated converters, with the reduced expense and other operating advantages, are utilized. Even with this advantageous feature, the system of this embodiment permits the rating, and thus the cost, of the high frequency link generator to be held to a minimum, while the link frequency may still be maintained at its optimal value. This arrangement thus results in improved performance (the frequencies of the output harmonics will not change), simpler control and reduced size in cost. Further, the operating reliability of the system is considerably improved due to the inherent redundancy in the arrangement proposed. In other applications it may even be desirable to increase the number of parallel connected converters, which would further minimize the variations in the reactive current supplied by the high frequency link generator (reactive power source).

The foregoing and other objects, advantages and features of this invention will hereinafter appear, and for purposes of illustration, but not of limitation, exemplary embodiments of the subject invention are shown in the appended drawing.

BRIEF DESCRIPTION OF THE DRAWING

FIG. 14 is a pair of schematic current vector diagrams illustrating various current output conditions and the corresponding current supplied by the high frequency generator;

FIG. 16 is a pair of schematic vector diagrams illustrating current conditions for two separate levels of power transmitted through the embodiment of FIG. 15.

DETAILED DESCRIPTION OF THE PREFERRED EMBODIMENT

Figure 1:
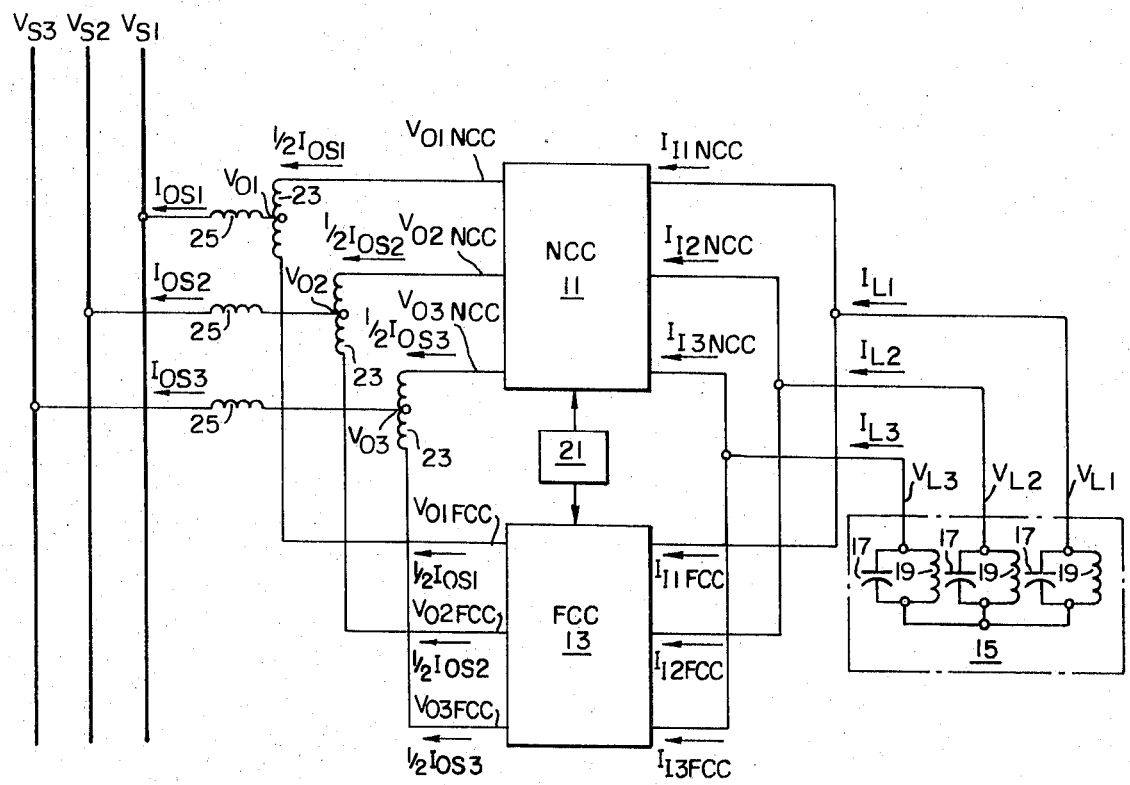
FIG. 1 is a schematic circuit diagram illustrating a first preferred embodiment of the present invention arranged to provide reactive power to an alternating current supply.

An arrangement for supplying reactive power to an alternating current (AC) supply is illustrated in FIG. 1. The AC supply is represented by the AC power lines having voltages $V_{S1}$, $V_{S2}$ and $V_{S3}$. Three power lines are utilized, as this particular embodiment is shown for use in supplying a three-phase system. Of course, the invention is not restricted to such a three-phase system, but may be equally well utilized with a single phase system.

In this particular embodiment, the basic constituent elements are a naturally commutated cycloconverter (NCC) 11, a force commutated cycloconverter (FCC) 13 and a reactive power source 15. Cycloconverters 11 and 13 are conventional frequency changers, with naturally commutated cycloconverter 11 being naturally or line commutated, while force commutated cycloconverter 13 is commutated independently of the line voltage. Examples of naturally commutated cycloconverters may be found in the text by B. R. Pelly entitled "Thyristor Phase-Controlled Converters and Cycloconverters," published by Wiley-Interscience division of John Wiley & Sons, Inc. in 1971. One type of force commutated cycloconverter that might be utilized for converter 13 is disclosed in U.S. Pat. No. 3,707,665 — Gyugyi, entitled "Power Frequency Changer With Controllable Input Displacement Factor."

Reactive power source 15 may be any conventional type of reactive power source, such as an over-excited synchronous machine, generally known as a synchronous capacitor or condenser. However, in the preferred embodiment of this invention, reactive power source 15 is a passive source, such as an inductive capacitive (LC) tuned circuit. As illustrated in FIG. 1, each phase of the AC voltage is associated with a tuned circuit having a capacitor 17 and an inductor 19. Reactive power source 15 has a frequency high relative to the frequency of the voltages produced at the outputs of cycloconverters 11 and 13, in order to minimize the distortion produced by constructing the output voltages from the voltages provided by the reactive power source. In the above-identified patent application of Pelly, Ser. No. 349,884, reactive power source 50 is identified as a "high frequency link generator." The terms "reactive power source" and "high frequency link generator" are used interchangeably herein.

In operation, naturally commutated cycloconverter 11 inherently has a lagging input power factor. The force commutated cycloconverter 13 is arranged to have an input power factor that is of the same magnitude as that of th naturally commutated cycloconverter 11, but which is leading, rather than lagging. Thus, if equal input currents are drawn by the cycloconverters 11 and 13, the reactive components at the fundamental frequency will cancel. The appropriate setting of the input power factors is achieved by properly relating the firing angles of the active components, such as thyristors, utilized in cyclconverters 11 and 13. This type of control of the firing angle is explained in detail in U.S. Pat. No. 3,707,665 — Gyugyi, entitled "Power Frequency Changer with Controllable Input Displacement Factor." Also, reference may be made to a copending application of John Rosa entitled "Arrangement and Method for Converting Electrical Power Without External Supply of Reactive Power Requirements," Ser. No. 351,057, filed Apr. 13, 1973. Both of these items are assigned to the same assignee as the present invention.

A control arrangement 21 is utilized to determine the output currents of cycloconverters 11 and 13. As indicated above, the firing angle of force commutated cycloconverter 13 is set so that force commutated cycloconverter 13 has a leading input power factor that is equal in magnitude to the inherent lagging input power factor of naturally commutated cycloconverter 11. In order to have the reactive input currents (fundamental frequency) to the cycloconverters cancel, it is necessary that these currents having opposite phases also be of the same magnitude. This is achieved by controlling cycloconverters 11 and 13 so that they each provide one half of the total reactive output current supplied to the AC power supply. The control means 21 insures this operation by determining when reactive power is required by the AC power supply and causing cyclconverters 11 and 13 to each produce one half of the current having the desired lagging or leading phase angle. The outputs of the cycloconverters 11 and 13 are passed through inductors, combined and conveyed to the AC power supply. In the preferred embodiment illustrated in FIG. 1, the currents from cycloconverters 11 and 13 are supplied to each end of an interphase reactor, such as inductor 23, and the combined output current is then derived at a center tap of the interphase reactor or inductor 23. The combined current is then conveyed to the AC supply line through an inductor 25.

Production of the desired reactive power may be achieved by modifying the output voltages of the cycloconverters 11 and 13. If the amplitude of the cycloconverter output voltage ($V_0$) is greater than that of the AC power supply line voltage ($V_S$) for a given phase, the cycloconverters 11 and 13 provide reactive power for a load having a leading power factor. On the other hand, if $V_0$ is less than $V_S$, the cycloconverters provide reactive power for a load having a lagging power factor. Such a variation in the magnitude of the output voltages of the cycloconverters 11 and 13 may be easily achieved by conveying real power to or from the tuned circuits of high frequency link 15. Such variations may be easily produced by slight modifications of the phase of the output voltage of the cycloconverters with respect to the supply line voltage $V_S$. These principles are illustrated in FIG. 2.

Figure 2:
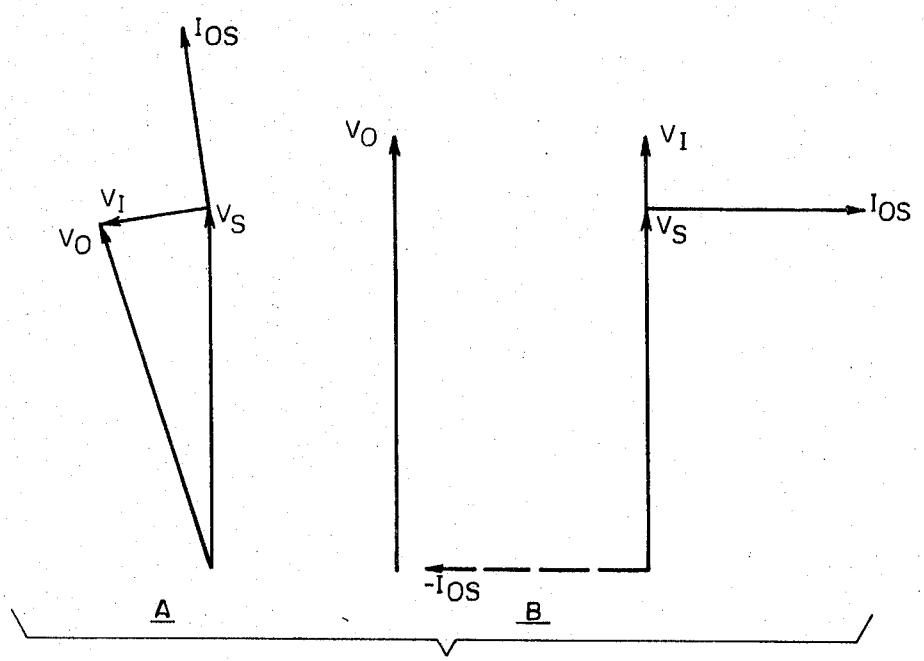
FIG. 2 is a pair of schematic vector diagrams illustrating certain voltage and current conditions in the embodiment of FIG. 1.

In interpreting the vector diagrams of FIG. 2, it is necessary to bear in mind certain conventions. Thus, for the current flow of $I_{os}$ shown in FIG. 1 from voltage $V_o$ at the midpoint of conductor 23 through the inductor 25 connecting this midpoint to the supply line voltage $V_S$, the voltage across the inductor (termed $V_I$) would be from $V_S$ to $V_0$. Also, while the illustrated direction of flow for current $I_{os}$ accurately describes the current flow from the cycloconverters 11 and 13, from the standpoint of the voltage supply lines the conventional current flow would be in the opposite direction (i.e., $-I_{os}$). This is accurate, since the source of reactive power will appear as a reactive load to the voltage power supply.

Bearing these conventions in mind, it may be seen by reference to the particular loading condition illustrated in FIG. 2, that while the current $I_{os}$ lags the voltage $V_S$ (i.e., provides reactive power for a load connected to the voltage supply lines), from the standpoint of the voltage supply, a leading reactive current is being supplied to the cyloconverters 11 and 13. In other words, the static power converter arrangement appears as a capacitive load drawing leading current to offset the lagging reactive current being drawn by an inductive load connected to the AC voltage supply.

As may be seen in diagram A of FIG. 2, the phase of the cycloconverter voltage $V_0$ has been slightly shifted in phase with respect to the line voltage $V_S$. This phase shift, which has been exaggerated for purposes of illustration, is produced by appropraite action of the control arrangement 21. Inasmuch as the output voltage connected to the AC supply line must be identical to the line voltage $V_S$, the voltage drop a cross the inductor 25 ($V_I$) must be such that when it is vectorially added with $V_0$, it produces the line voltage $V_S$. Since the current in an inductor always lags the voltage by 90°, the current through inductor 25 would be the current $I_{os}$ illustrated in diagram A. It will be noted that the current $I_{os}$ is virtually in phase with the line voltage $V_S$. Thus, real power is being conveyed through the cycloconverters to the passive high frequency link 15. This will increase the voltage at the output of the cycloconverters and the result will be that as indicated in diagram B of FIG. 2.

The increase of the magnitude of the potential output of passive high frequency link 15 increases the magnitude of voltage $V_0$ at the output of the cycloconverters. At this point, as may be seen in diagram B of FIG. 2, $V_0$ is greater than $V_S$. Thus, the voltage drop $V_I$ across the inductor 25 must have the opposite phase of $V_0$ to bring the voltage connected to the line to the desired magntiude of $V_S$. Again, the current through inductor 25 would lag $V_I$ by 90°, as illustrated. As indicated by the dotted lines, while $I_{os}$ lags $V_I$ and $V_S$, $-I_{os}$ leads $V_S$. As previously indicated, this means that, from the power supply's standpoint, the static converters are drawing leading current. Therefore, the conditions shown and described in FIG. 2 may be utilized to cause the circuit of FIG. 1 to produce reactive power for a lagging power factor load. It also may be shown that by phase shifting $V_0$ in the opposite direction, power would be removed from the high frequency link 15 and reactive current to supply a leading power factor load would be produced.

Figure 3:
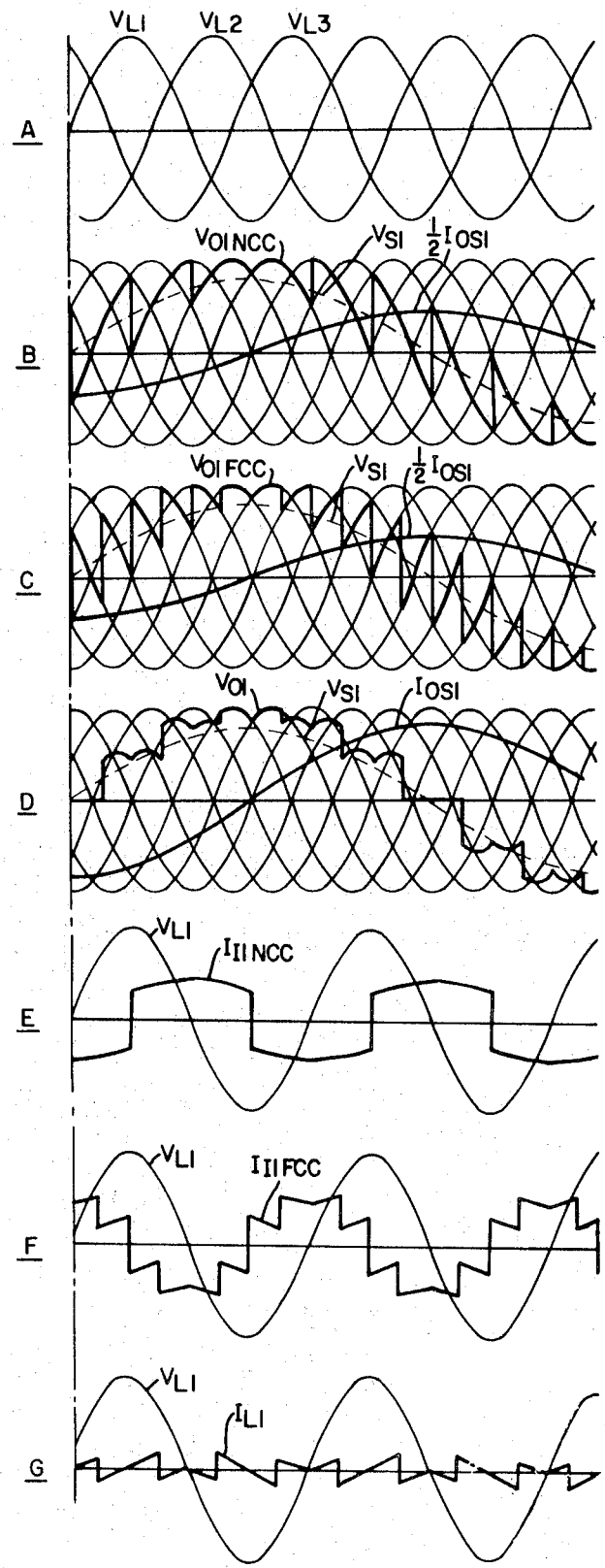
FIG. 3 is a series of schematic waveform diagrams illustrating various voltage and current conditions when the alternating current supply to which the embodiment of FIG. 1 is connected is supplying a leading load.

The wave diagram of FIG. 3 illustrates the various voltages and currents appearing in the circuit of FIG. 1 for the conditions discussed in FIG. 2. As may be seen from waveform D of FIG. 3, the voltage $V_{01}$ allocating the generalized voltage $V_0$ to the line identified as 1) is greater than the line voltage $V_{S1}$. Therefore, by the previous analysis, th current $I_{oS1}$ should lag voltage $V_{S1}$ (and $-I_{oS1}$ would lead) and the static power converter would appear as a capacitive or leading pwoer factor load to the voltage supply, which is verified. As may be seen from waveforms E, F and G of FIG. 3, the input currents to the naturally commutated cycloconverter 11 and the force commutated cycloconverter 13 cancel each other at the fundamental frequency, so that the passive high frequency link generator 15 need only provide reactive power for the harmonic frequencies. (Of course, the small real power losses of the cycloconverters 11 and 13 and the high frequency link generator 15 are provided by the AC power supply.)

Figure 4:
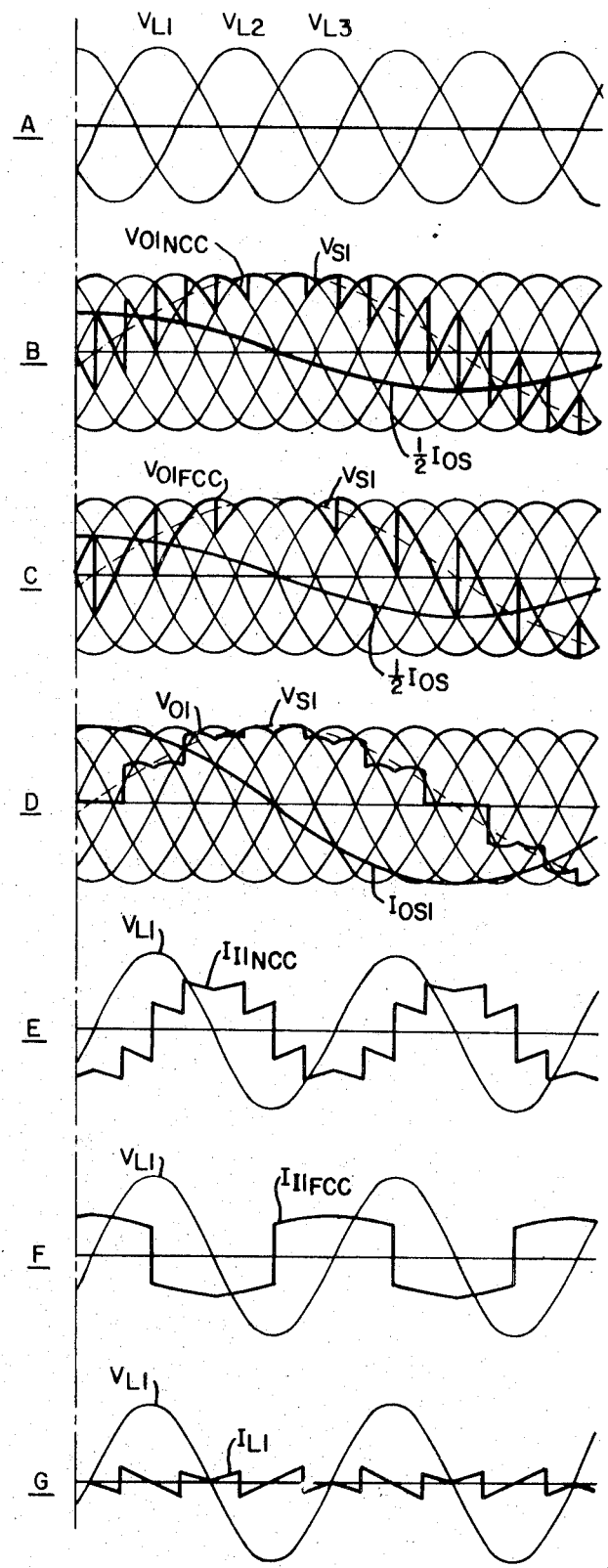
FIG. 4 is a series of schematic waveform diagrams illustrating various voltage and current conditions when the alternating current supply to which the embodiment of FIG. 1 is connected is supplying a lagging load.
Figure 5:
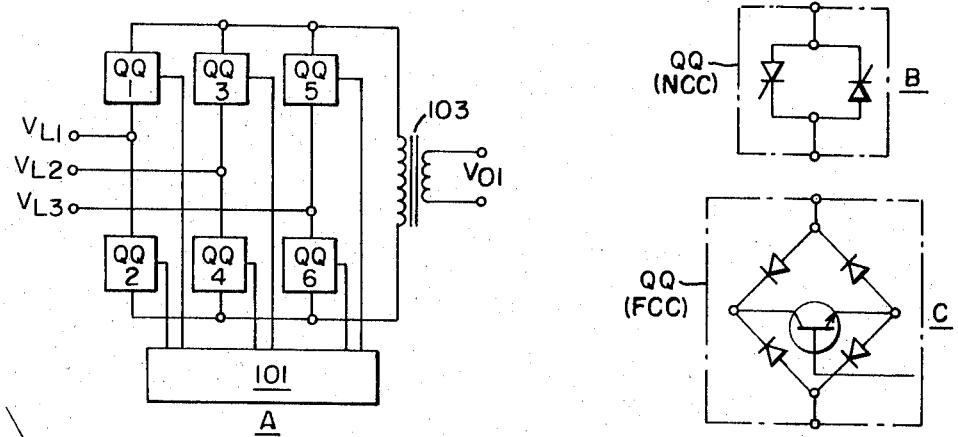
FIG. 5 is a schematic circuit diagram of a basic cycloconverter, with an illustration of the particular elements that could be utilized to obtain either natural commutation or forced commutation.

FIG. 4 represents the opposite condition (i.e., when the static power converter draws lagging current from the AC voltage supply and appears as an inductive load). As previously explained, the voltage $V_{01}$ should be less than $V_{S1}$ for these conditions, which waveform D of FIG. 4 illustrates is the case and $I_{oS1}$ leads $V_{S1}$. Thus, reactive power is provided for a leading power factor or capacitive load connected to the AC power supply line. Again, as seen in waveforms E, F and G of FIG. 4, the input currents at the fundamental frequency to the cycloconverters 11 and 13 cancel each other so that the high frequency link 15 need not provide any reactive power to the system.

Control of cycloconverters 11 and 13 is illustrated in FIGS. 5–11. In FIG. 5A there is illustrated a six pulse cycloconverter having switch elements QQ1–QQ6. The switch elements QQ1–QQ6 are actuated by a switch conduction control arrangement 101, illustrated in detail in FIGS. 6 and 7, to pass the link voltages $V_{L1}$, $V_{L2}$, and $V_{L3}$ to a transformer 103 to produce a single phase output voltage $V_{01}$. This basic system may be modified to produce a three phase output such as shown, for example, in FIG. 8 of U.S. Pat. No. 3,707,666 — Gyugyi, entitled "Unity Input Displacement Factor Frequency Changer," assigned to the same assignee as the present invention. Exemplary structures for the switch elements QQ1–QQ6 are shown in FIG. 5B for a naturally commutated cycloconverter and in FIG. 5C for a forced commutated cycloconverter.

Figure 7:
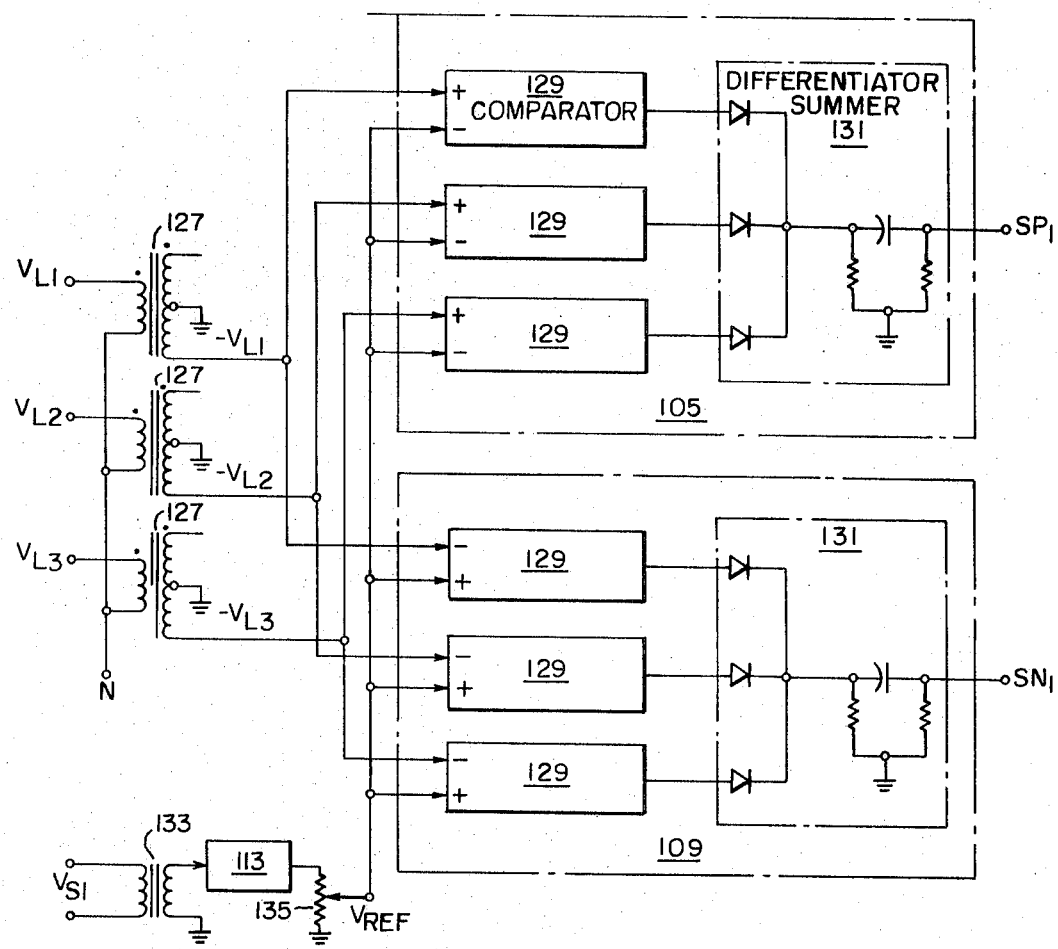
FIG. 7 is a schematic circuit diagram illustrating sinewave crossing control circuitry that could be utilized in the circuit of FIG. 6.
Figure 6:
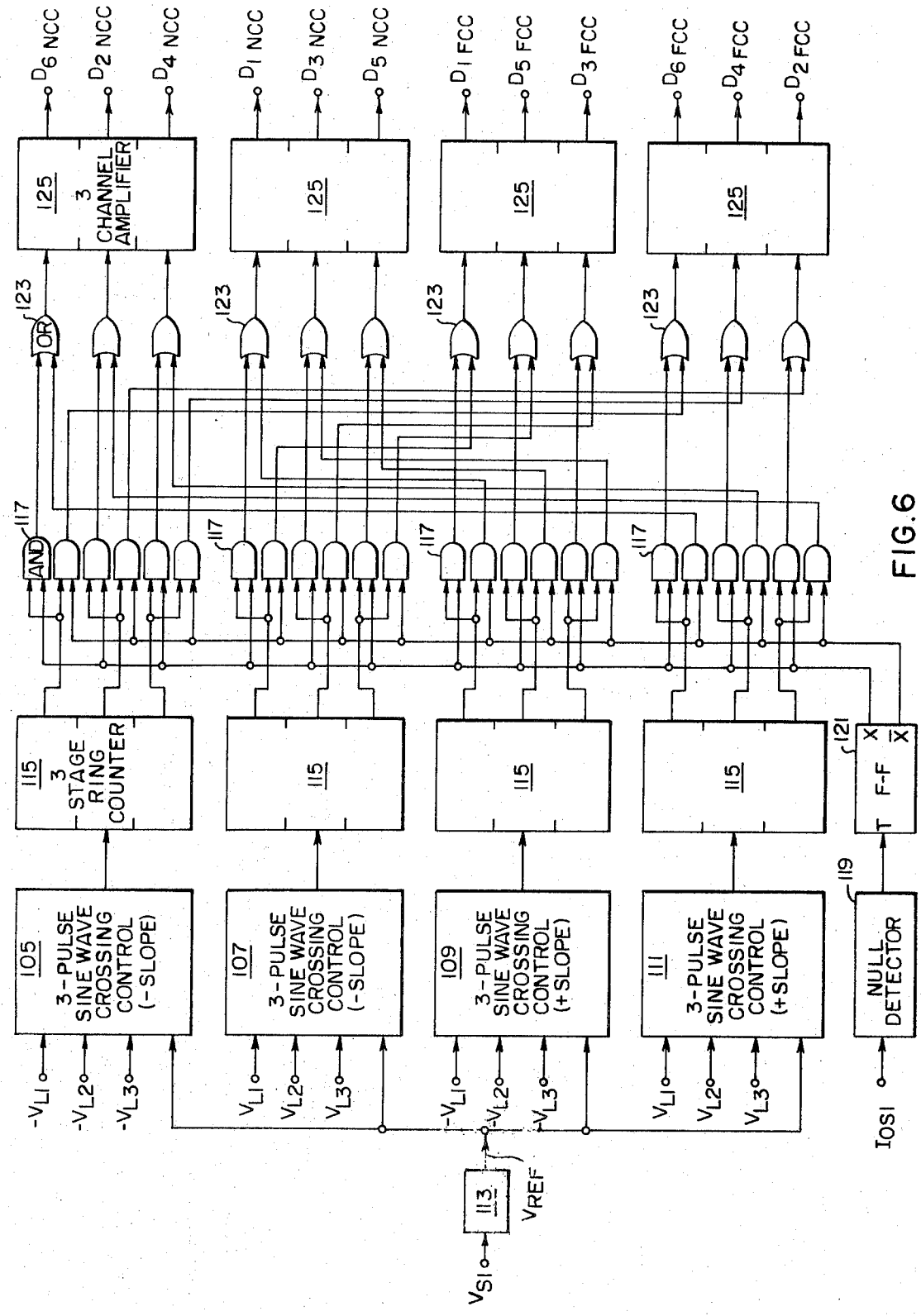
FIG. 6 is a schematic circuit diagram of one type of arrangement that could be utilized to produce firing pulses for the converters of FIG. 1.

The switch conduction control circuitry 101 illustrated in FIGS. 6 and 7 is basically shown and described in U.S. Pat. No. 3,707,666, the disclosure of which is incorporated herein by reference. The circuitry disclosed in FIGS. 6 and 7 is for a single phase, chosen for purposes of illustration as the phase identified by $V_{S1}$ in FIG. 1.

As may be seen in FIG. 6, 3-pulse sinewave crossing control circuits 105 and 107 produce pulses $S_{P1}$ and $S_{P2}$ based upon the intersections of the reference voltage $V_{REF}$ with the negative slopes of the link voltages $V_{L1}$, $V_{L2}$, and $V_{L3}$. Circuit 105 deals with the negative slopes of the inverted link voltages, while circuit 107 utilizes the normal link voltages. Similarly, circuits 109 and 111 produce pulses $S_{N1}$ and $S_{N2}$ based upon the intersections of $V_{REF}$ with the positive slopes of the link voltages. The reference voltage $V_{REF}$ is produced from the line voltage $V_{S1}$ by a suitable adjusting arrangement 113. In the particular example discussed above, the adjusting arrangement 113 would be a controllable phase shifter to produce the necessary change in the magnitude of the link voltages. However, other suitable arrangements might be employed.

Figure 8:
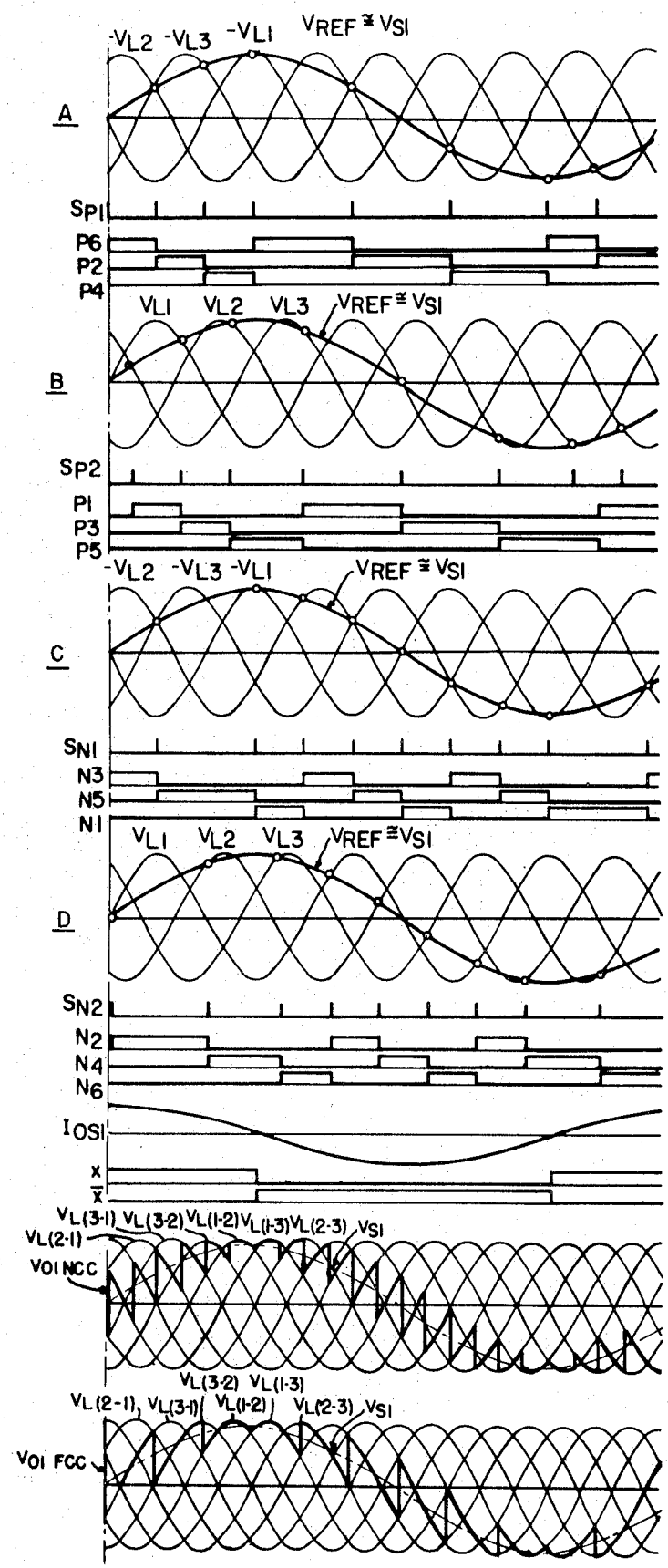
FIG. 8 is a series of waveform diagrams illustrating the production of firing pulses by the circuitry of FIG. 6 and the resultant composite waves.

The spike pulse outputs $S_{P1}$, $S_{P2}$, $S_{N1}$, and $S_{N2}$, illustrated in FIG. 8, are each applied to a three stage ring counter 115 to produce pulses $P_1$–$P_6$ and $N_1$–$N_6$, also illustrated in FIG. 8. Pulses $P_1$–$P_6$ and $N_1$–$N_6$ are applied to a series of AND gates 117. AND gates 117 also have a squarewave X of $\bar{X}$ applied thereto. The X and $\bar{X}$ signals are produced by passing a signal representing the reactive current $I_{0S1}$ through a null detector 119 and a flip-flop circuit 121 to produce squarewaves that are displaced 90° with respect to the reference voltage $V_{REF}$. The outputs of the AND gates 117 are then passed to appropriate OR gates 123.

AND gates 117 and OR gates 123 are utilized in order to insure that the naturally commutated cycloconverter 11 and the forced commutated cycloconverter 13 draw reactive input currents of the opposite phase angle. Since naturally commutated cycloconverter 11 must always draw a lagging current, the pulses passed to the switch elements QQ1–QQ6 must be at the proper times to permit the cycloconverter 11 to be commutated by the line voltages. This also means, of course, that force commutated cycloconverter 13 must be fired to draw a leading current to offset the lagging current drawn by naturally commutated cycloconverter 11.

The outputs of OR gates 123 are conveyed to three channel amplifiers 125 to produce the pulses designated by the letter D. The subscripts of these D pulses identify the switch elements shown in FIG. 5A to which they are routed in either the naturally commutated cycloconverter 11 or the forced commutated cycloconverter 13. The resultant cycloconverter output voltages $V_{01NCC}$ and $V_{01FCC}$ are illustrated in FIG. 8 for the operating condition shown in FIG. 4.

In FIG. 7 the 3-pulse sinewave crossing controls 105 and 109 are shown in greater detail. It may be seen that the inverse of each of the link voltages is obtained by an appropriate transformer 127. Each of the negative link voltages is conveyed to an associated comparator 129 and each of the 3-pulse sinewave crossing controls 105 and 109. The outputs of the three comparators 129 in each of the 3-pulse sinewave crossing controls 105 and 109 is conveyed to an appropriate differentiator summer 131, from which the signals $S_{P1}$ and $S_{N1}$ are obtained. Each of the comparators 129 has a second input, namely, the reference voltage $V_{REF}$. As seen in FIG. 7, this reference voltage may be produced by obtaining voltage $V_{S1}$ by means of a transformer 133, modifying this signal as desired by a reference adjustment arrangement 113, and obtaining the reference voltage $V_{REF}$ across a resistor 135 at the output of the adjustment arrangement 113.

Figure 9:
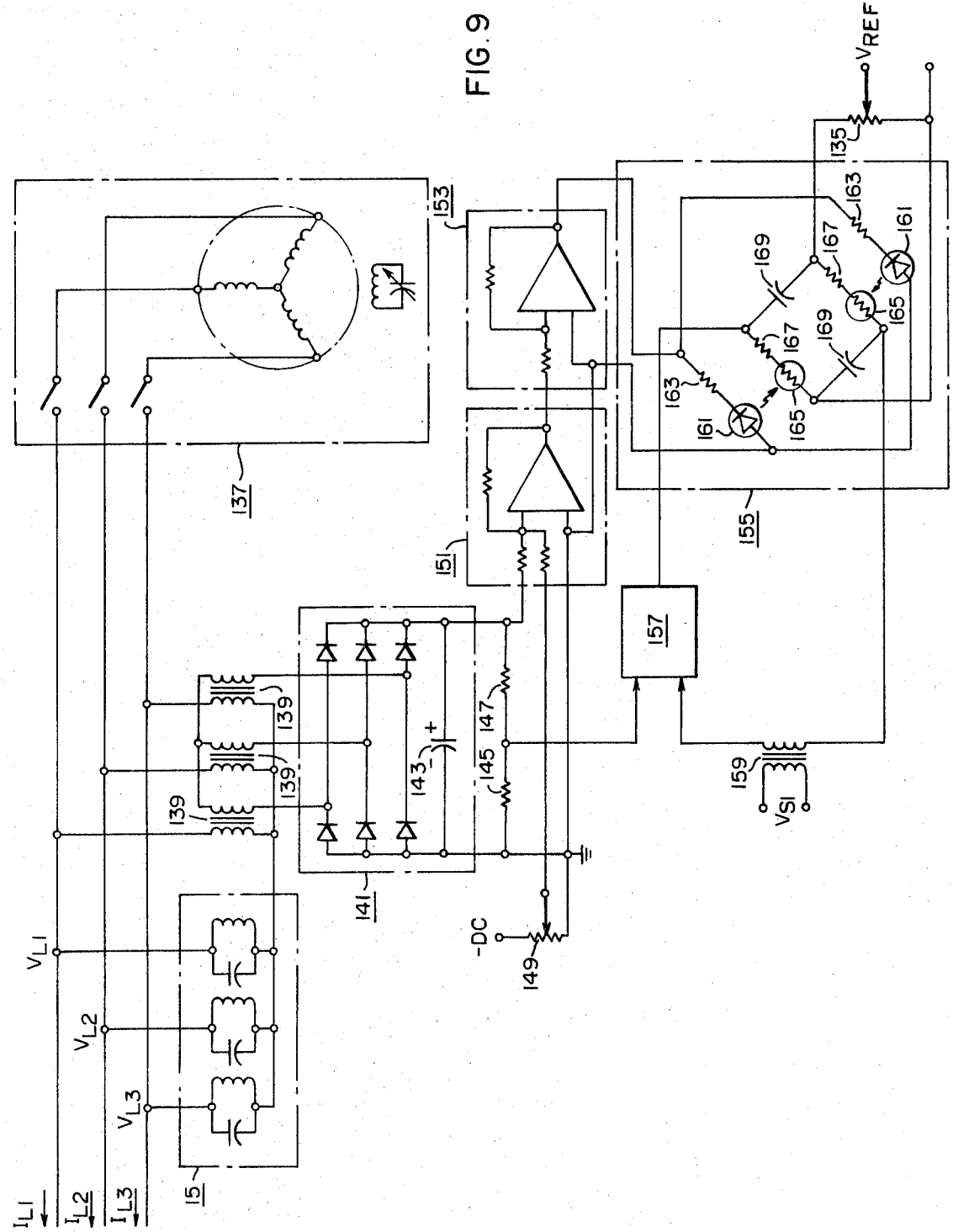
FIG. 9 is a schematic circuit diagram of an arrangement for controlling the reactive current provided by the cycloconverters of FIG. 1.

As indicated previously, the reference adjustment arrangement 113 may be any suitable type of arrangement. However, for the preferred embodiment of FIG. 1, the desired control of the reactive power supplied by the cycloconverters can be adjusted by controlling the magnitude of the voltages produced by the cycloconverters. As indicated in the discussion in connection with FIG. 2, this control may be achieved by altering the phase between the line voltage and the voltages produced by the cycloconverters. Thus, for this particular approach, the reference adjustment arrangement 113 becomes a controllable phase shifter, as illustrated in FIG. 9.

High frequency link generator 15 is arranged to provide the link voltages $V_{L1}$, $V_{L2}$ and $V_{L3}$, as shown in FIG. 1. It is necessary to provide some arrangement for initially energizing the high frequency link generator 15. One method of doing this, as illustrated in FIG. 9, is to utilize a synchronous generator, schematically depicted as 137, to provide energy to the high frequency link generator 15 During charging of the LC tank circuits, the cycloconverters would not be operated.

Another approach that may be utilized to initially energize the passive high frequency link generator 15, as referred to above, is to utilize force commutated cycloconverter 13. During the initial charging of the tank circuit through FCC 13, naturally commutated cycloconverter 11 would not be operated. To achieve initial energization by use of the force commutated cycloconverter 13, FCC 13 is operated with fixed conduction intervals. In other words, each pair of switches in force commutated cycloconverter 13 is made to conduct for a fixed time interval in the normal switching sequence, where the time interval is defined by $T_S - 1/6 (f_L + f_S)$, where $f_L$ is the wanted link (LC tank circuit) frequency and $f_S$ is the AC source (line frequency (60 Hz).

The link voltages produced by the high frequency link generator 15 are obtained across transformers 139 and conveyed to a rectifier 141. The output of rectifier 141 is obtained across a capacitor 143 and connected across series resistors 145 and 145, which provide a divider network. A DC reference voltage is obtained from a controllable source, such as rheostat 149. This DC reference voltage represents the desired amplitude of the link voltages and is compared with the rectified actual link voltages in error amplifier 151. The output of error amplifier 151 is then amplified by power amplifier 153 and conveyed to an RC-CR bridge network 155.

Another input for RC-CR bridge network 155 is obtained from a multiplier 157. Multiplier 157 has one input from the juncture of resistors 145 and 147. Another input for multiplier 157 is obtained directly from the AC line voltage $V_{S1}$ via a transformer 159. The multiplier 157 produces an AC voltage that is in phase with the AC line voltage and the amplitude of which is a function of the link voltage. By appropriately choosing the values of resistors 145 and 147, the amplitude of the AC signal at the output of the multiplier 157 is always slightly smaller than that of the signal representing the tank voltage. Thus, the condition required for safe operation of the sinewave crossing control circuits 105, 107, 109 and 111 is achieved.

The output of the power amplifier 153 is utilized to drive a pair of light emitting diodes 161, each of which is connected in series with a resistor 163. The light produced by light emitting diodes 161 controls the resistance of photoresponsive devices, such as cadmium sulfide photocells 165. Photocells 165 are in series with resistors 167 and, in connection with capacitors 169, form a phase shifting bridge network. Such an RC-CR bridge arrangement varies the phase of the AC input signal obtained from multiplier 157 without changing the amplitude of the signal. Therefore, the AC voltage at the output of multiplier 157 is phase shifted by the RC-CR network 155 to produce a voltage reference $V_{REF}$, as obtained from a desired tap on resistor 135. The reference voltage $V_{REF}$ will thus possess the desired amplitude and have a phase shift such as to regulate the amplitude of the link voltages, and thus cause the cycloconverters 11 and 13 to provide the desired reactive power to the AC power lines.

Figure 10:
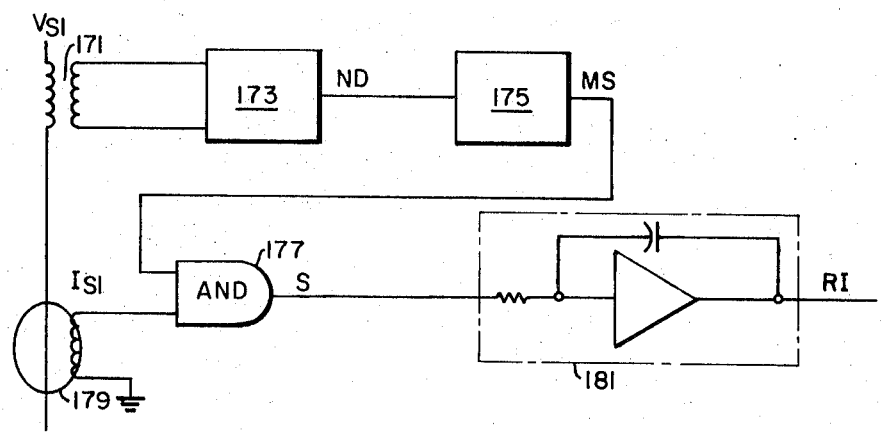
FIG. 10 is a schematic diagram illustrating one method of regulating the control exercised by the circuit of FIG. 9.

The phase shift of $V_{REF}$ is determined by the setting of the tapped resistor or rheostat 149. This may be done manually or in any other appropriate fashion. However, for the particular embodiment disclosed in FIG. 1, it is desired to have the setting determined by the reactive power requirements of the AC power lines. One way of controlling the phase angle of $V_{REF}$ in accordance with thereactive power requirements is illustrated in FIG. 10. In this particular embodiment, a transformer 171 is utilized to connect the line voltage $V_{S1}$ to a null detector 173. The output of null detector 173 is conveyed to a monostable multivibrator circuit 175, which produces an output that is applied as an input to an AND gate 177. Another input for AND gate 177 is obtained from a current pickup coil 179, which provides a signal indicative of the current in the line having line voltage $V_{S1}$. An integraor 181 receives the output of AND gate 177 and provides a signal that may be calibrated and utilized to determine the setting of rheostat 149.

Figure 11:
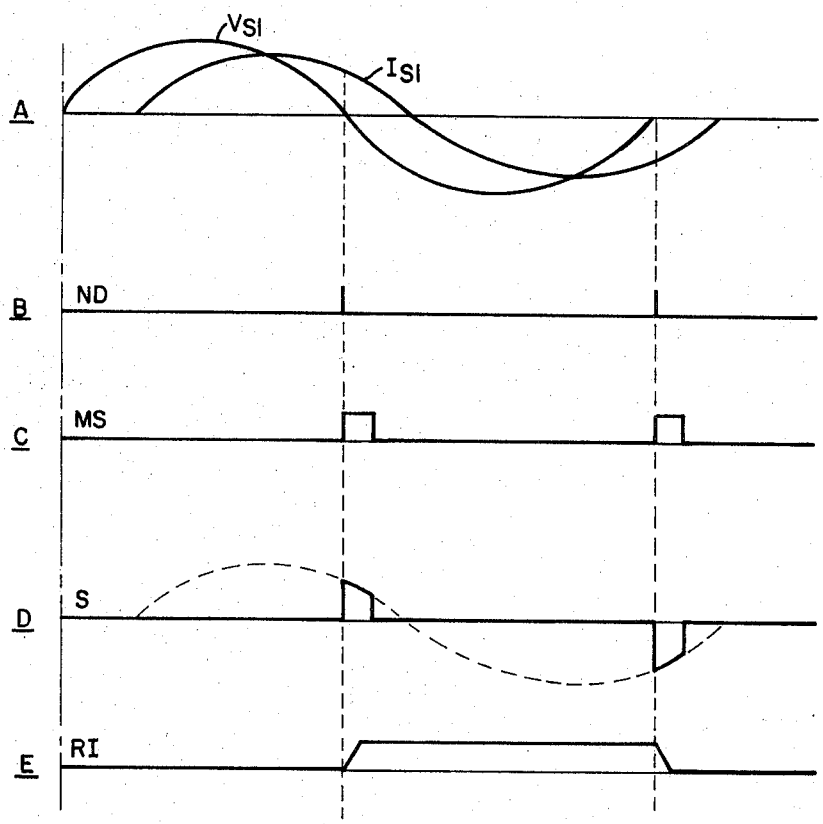
FIG. 11 is a series of waveform diagrams indicating operation of the circuit of FIG. 10.

The operation of the circuit of FIG. 10 may be better understood by reference to the wave diagrams of FIG. 11. By reference to diagram A of FIG. 11 (hereinafter referred to as diagram 11A, while the other diagrams will also be identified by figure number and diagram letter), it may be seen that an example has been chosen in which the line current $I_{S1}$ lags the line voltage $V_{S1}$. As each of the voltage zero crossings, null detector 173 produces a spike ND, as illustrated in diagram 11B. Spikes ND are then transformed into a rectangular pulse by a monostable multivibrator 175, as illustrated in diagram 11C. Application of the monostable pulse MS to AND gate 177 will cause the current $I_{S1}$ to be passed through gate 177 during this period, as shown in diagram 11D. At the voltage zero crossings the real component of $I_{S1}$ is zero, therefore the obtained current represents the magnitude of the reactive current component. Integrator 181 integrates the signal S to produce the output signal RI, as illustrated in diagram 11E. Thus, the signal RI indicates the reactive power that is needed and may be utilized to set the rheostat 149 to provide the requisite phase shift of $V_{REF}$ to provide this reactive power. It should be noted that if $I_{S1}$ was leading $V_{S1}$, the positive RI signal shown in waveform diagram 11E would appear in the preceding time period, so that both the magnitude and the sense of the setting of rheostat 149 may be determined from the RI signal.

Figure 12:
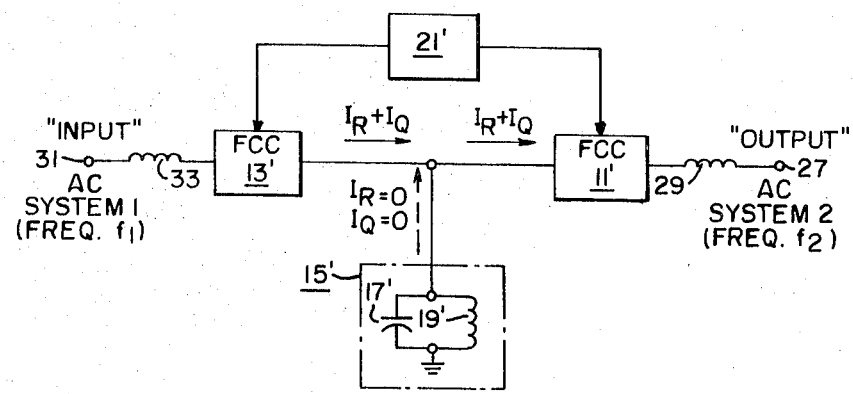
FIG. 12 is a schematic circuit diagram illustrating the embodiment of FIG. 1 connected to tie two AC systems.

A modification of the system of FIG. 1 employed to tie two AC systems, rather than to provide reactive power, is illustrated in FIG. 12. In this arrangement, a naturally commutated cycloconverter (NCC) 11' is connected to a terminal 27 of a first AC system through an inductor 29. A force commutated cycloconverter (FCC) 13' is connected to a terminal 31 of a second AC system through an inductor 33. The other sides of naturally commutated cycloconverter 11' and force commutated cycloconverter 13' are connected together and to a high frequency link generator 15', comprising a capacitor 17' and an inductor 19'.

As in the case of the FIG. 1 embodiment, the force commutated cycloconverter 13' is set to have an input phase angle of the same magnitude but opposite sign to that of the naturally commutated cycloconverter 11'. A control arrangement 21' insures that the current magnitudes at the outputs of the cycloconverters are identical, so that the reactive currents to the inputs of the cycloconverters 11' and 13' cancel. As a result, the high frequency link generator 15' need supply neither real nor reactive power at the fundamental frequency, although it must supply some reactive power at the harmonic frequencies.

For purposes of illustration, it has been assumed that power input is at terminal 31. The AC signal at this input terminal 31 has a frequency $f_1$, which may be the same or different from the frequency $f_2$ at output terminal 27. In general, when onnecting or tying two AC systems, the frequencies $C_1$ and $C_2$ would be different, since the static power converter would perform a frequency changing function. Of course, the arrangement is not limited to use in tying two AC systems, as it could equally well be utilized to tie an AC system to a DC system, or a DC system to a DC system. In these latter two cases, the converters 11' and 13' would not both be cycloconverters, but would include at least one AC to DC converter or DC to AC inverter. Further, in the tying of two AC systems, as illustrated in FIG. 12, the naturally commutated cycloconverter 11' and the force commutated cycloconverter 13' need not be in the positions shown but could be reversed.

With the example indicated of power input at terminal 31, the output of force commutated cycloconverter 13' would actually be the input of the system. The output of the naturally commutated cycloconverter 11' would be the output of the system, so that when these two outputs are arranged to be identical in terms of power handled, there would be a throughput of power from terminal 31 to terminal 27, with the high frequency link generator 15' providing the voltage signals which are utilized to formulate the outputs of the cycloconverters 11' and 13'. However, this high frequency link generator 15' would not have to provide any real or reactive power at the fundamental frequency.

Figure 13:
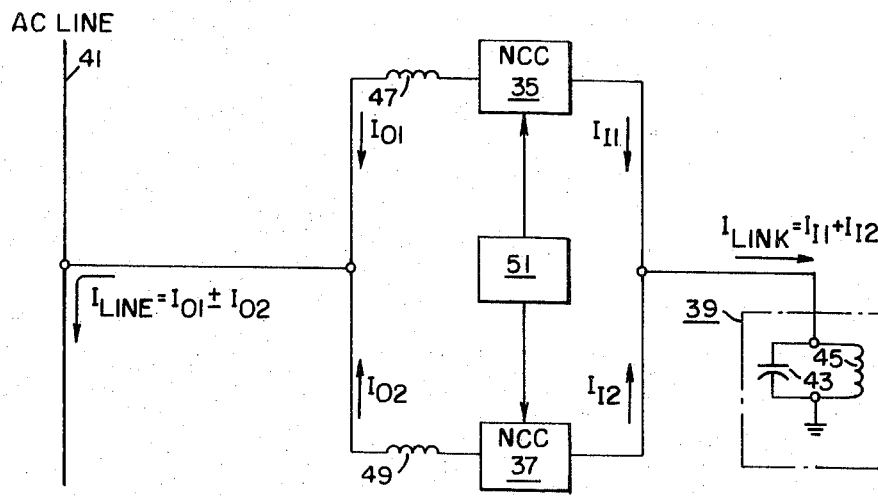
FIG. 13 is a schematic circuit diagram of another preferred embodiment of the present invention arranged to supply reactive power to an alternating current supply.

Another embodiment of the present invention is illustrated in FIG. 13. In this embodiment, a first naturally commutated cycloconverter 35 and a second naturally commutated cycloconverter 37 are connected in parallel between a reactive power source or high frequency link generator 39 and an AC power supply indicated by a line 41. High frequency link generator 39 is shown as a passive source having a capacitor 43 and an inductor 45 in a tuned circuit arrangement. The inputs of naturally commutated cycloconverters 35 and 37 are connected to the high frequency link generator 39, while the outputs of the cycloconverters 35 and 37 are connected to AC power supply 41 through inductors 47 and 49, respectively.

As previously indicated, the naturally commutated cycloconverters have an inherent lagging input power factor. Thus, the reactive current provided by high frequency link generator 39 is lagging and is the sum of the input current $I_{I1}$ to naturally commutated cycloconverter 35 and the input current $I_{I2}$ to cycloconverter 37. The current to the AC supply line 41 from the static power converter arrangement is the sum of the output current $I_{o1}$ of cycloconverter 35 and $I_{o2}$ of cycloconverter 37.

In order to obviate the difficulties encountered by frequency variations in the signal supplied by the high frequency link generator 39, it is desired to minimize variations in the current supplied by the high frequency link 39. Since the input currents of the cycloconverters 35 and 37 always are lagging, regardless of the output current phase angles, the reactive current drawn from the high frequency link 39 may be maintained relatively constant by maintaining the absolute value of the output currents as nearly constant as possible. Therefore, a control arrangement 51 is utilized to add and subtract the output currents of the cycloconverters 35 and 37 in such a fashion as to provide the desired reactive power to the AC power line 41 while maintaining the absolute value of the currents drawn from the cycloconverters as nearly constant as possible. The schematic vector diagrams of FIG. 14 illustrate the output and input current conditions that may be achieved by utilizing this method.

As may be seen from diagram A of FIG. 14, each of the cycloconverters 35 and 37 can be adjusted to provide from zero to one half per unit (P.U.) of line current. By utilizing the various current additions and subtractions illustrated in diagram A, the input current conditions of diagram B in FIG. 14 may be realized. It should be noted that the variations in the input current that must be supplied by the high frequency link generator 39 have been limited to a variation between one per unit (P.U.) to one half P.U., as compared to the variation from one P.U. to zero that results when a single naturally commutated cycloconverter is utilized with the high frequency link generator. With respect to the frequency of the high frequency link generator 39, this means that the frequency variation is limited to approximately 25 percent, which is a practically acceptable variation and does not necessitate an excessive increase in the rating of the high frequency link generator components.

There are any number of approaches that can be utilized for control arrangement 51, and thus no specific circuit is described. However, it should be recognized that each of the naturally commutated cycloconverters 35 and 37 will have to be independently controlled, rather than a single control for both cycloconverters as in the FIG. 1 embodiment. The basic principle of control is the same as that utilized in connection with the FIG. 1 embodiment, namely, that the sense and magnitude of the reactive power supplied may be controlled by adjusting the magnitude of the cycloconverter output voltages with respect to the line voltages. So long as the link voltages which are utilized to construct the output voltages of the cycloconverters are equal to or greater than $V_{REF}$, the amplitude of $V_{REF}$ may be varied to provide the desired control of the reactive power supplied by a cycloconverter. Thus, the controls provided for each of the cycloconverters 35 and 37 by control arrangement 51 may be essentially the same as those disclosed in FIG. 6, with suitable modifications for the fact that each of the circuits is controlling only a single cycloconverter. In such a case, each of the adjusting arrangements 113 would then be a simple amplitude adjusting circuit to modify the amplitude of the line voltage $V_{S1}$ to provide the desired reference voltages $V_{REF}$.

In order to provide the desired control by arrangement 113, a circuit such as that disclosed in FIG. 10 could be utilized to provide the desired information as to the reactive power that had to be provided by each of the cycloconverters 35 and 37. For the sake of simplicity, it could be assumed that one of the cycloconverters 35 or 37 is set to provide a maximum (i.e., one-half P.U.) lagging or leading current as required by the line. With the circuit of FIG. 10 this could easily be accomplished, as illustrated by the wave diagrams of FIG. 11, and this naturally commutated cycloconverter would then have $V_{REF}$ of either maximum or minimum amplitude, according to the necessary phase angle of the current.

With one of the cycloconverters 35 or 37 set for the maximum current with the required phase angle, the output RI of integrator 181 would then be utilized to determine whether the other cycloconverter would have to provide a reactive current that added to or subtracted from the maximum value established by the first cycloconverter output. A simple comparator circuit could be utilized for this function, and the reference voltage $V_{REF}$ for the second cycloconverter could be set at the amplitude to produce the necessary reactive current.

As indicated previously, this is merely one suggested appraoch that might be taken for the control arrangement 51. Many other approaches could be utilized or other modifications could be introduced, such as equally dividing the reactive currents provided by cycloconverters 35 and 37 to the greatest extent possible. However, such modifications are merely refinements to the basic invention disclosed herein of simultaneously controlling the two naturally commutated cycloconverters in parallel to maintain the lagging input current drawn by the cycloconverters at as near a constant level as possible.

The performance of this embodiment may be further improved by increasing the number of naturally commutated cycloconverters connected in parallel between the high frequency link generator 39 and the power supply line 41, such as four converters each with a rating of one quarter P.U. With even just four cycloconverters, the effect on the frequency of the high frequency link generator 39 can be virtually eliminated. It should be noted that the employment of four converters may not represent a disadvantage in very high power systems, since large numbers of devices would be needed anyway to handle the required reactive power. In fact, it may even be considered to be advantageous to utilize a plurality of independent converters, due to the redundancy inherent in such a system (i.e., the system would operate without interruption, at reduced rating, even if fatal failures would occur in one or two of the cycloconverters).

Figure 15:
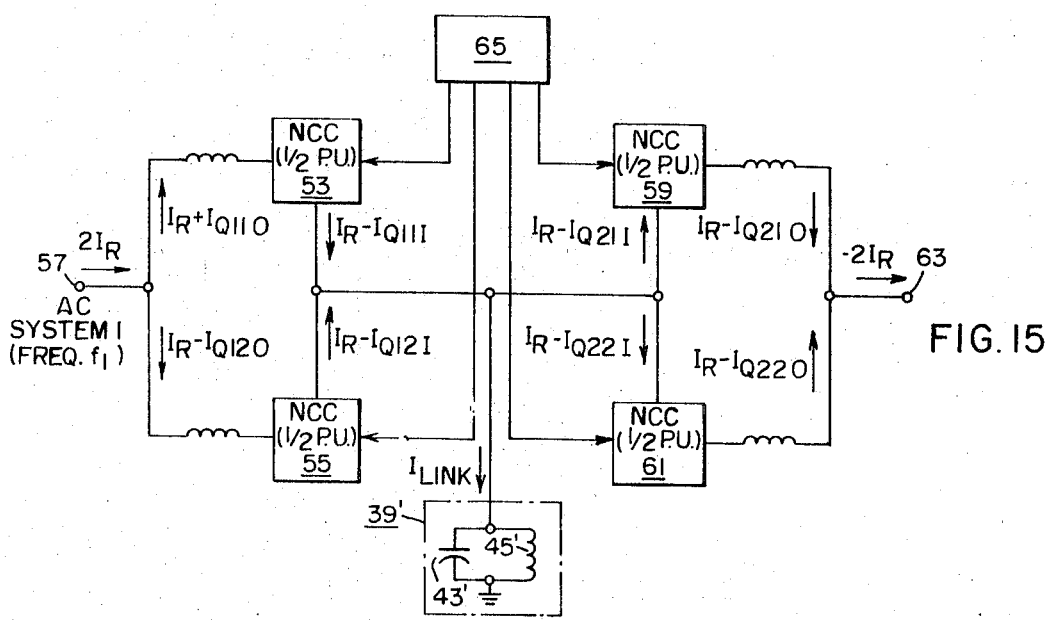
FIG. 15 is a schematic circuit diagram illustrating the embodiment of FIG. 13 modified to tie two AC systems.

As in the case of the FIG. 1 embodiment, the FIG. 13 embodiment may also be modified for utilization in tying two AC systems. (Also, as indicated previously, the arrangement may be utilized to tie an AC system to a DC system, or a DC system to a DC system.) In making this modification, as illustrated in FIG. 15, a parallel arrangement of naturally commutated cycloconverters of the type illustrated in FIG. 13 is connected between each of the AC systems and the high frequency link generator 39'. A first pair of naturally commutated cycloconverters 53 and 55 is connected in parallel between the high frequency link generator 39' and a terminal 57 of a first AC system having a signal with the frequency $f_1$. A second pair of naturally commutated cycloconverters 59 and 61 is connected in parallel between the high frequency link generator 39' and a terminal 63 in a second AC system having a signal with a frequency $f_2$. As in the embodiment of FIG. 13, a control arrangement 65 is utilized to adjust the output currents of the cycloconverters 53, 55, 59 and 61, so that the reactive current supplied by the high frequency link generator 39 is maintained at as constant a value as possible. Assuming an input of power on terminal 57, cycloconverters 53 and 55 are controlled to operate in a regenerative mode and deliver power to the cycloconverters 59 and 61 for conveyance to the terminal 63. To illustrate the operation of this embodiment, diagrams A and B of FIG. 16 illustrate, respectively, the operation of the system for transferral of a real power of one per unit (P.U.) and one half P.U.

Since a naturally commutated cycloconverter always has a lagging input power factor, it cannot operate with a unity power factor input. In the case of a unity output power factor (the case assumed for purposes of this illustration), the input power factor could not be higher tahn 0.83 lagging. Therefore, for a one P.U. throughput power, the reactive current that must be supplied by the high frequency link generator 39' is the sum of the four lagging input currents to the cycloconverters 53, 55, 59 and 61. As may be seen from diagram A of FIG. 16, this adds to 1.25 P.U. current that must be supplied by the high frequency link generator 39'.

To illustrate how the method of this embodiment may be utilized to maintain a nearly constant high frequency link generator current, waveform B of FIG. 16 illustrates the conditions for transferring one half P.U. power at unity power factor through the arrangement. In this case, the reactive link current without use of the present invention would also be decreased to one half (resulting in a corresponding decrease in the link frequency), since the input power factor of both converters would not change (with a unity power factor output it would remain at 0.83). In order to prevent this undesired variation in the high frequency link generator frequency of operation, the controlled arrangement 65 would cause one cycloconverter in each pair to operate with a leading power factor output, while the other cycloconverter in the parallel pair would be caused to have a lagging output power factor. The combined output power factor would, of course, remain at unity, since the leading and lagging quadrature components of the two output currents would cancel each other. The quadrature component of the input currents would, however, increase due to a decreased input power factor. Since all input currents to the cycloconverters are lagging, they reinforce each other and thus increase the link current. Therefore, it can be readily seen that the link current can be increased to its original rated value by appropriately controlling the output power factors of the individual cycloconverters.

By utilization of the embodiments disclosed herein, reactive power can be supplied to an AC power supply, or power may be transferred from one system to another by tying the systems with the static power converter arrangement disclosed herein, while minimizing, if not eliminating, variations in the reactive current that must be provided by the high frequency link generator (reactive power source). Further, in some of the embodiments, the necessity of the high frequency link generator supplying any reactive current at the fundamental frequency is eliminated. Consequently, the highly desirable and novel high frequency link generator arrangement disclosed by B. R. Pelly in the above-identified application Ser. No. 349,884 has been further improved upon to significantly advance the practicality and utility of the arrangement.

It should be understood that various modifications, changes and variations may be made in the arrangements, operations and details of construction of the elements disclosed herein without departing from the spirit and scope of the present invention.

I claim:

1. A static power conversion arrangement comprising:
   a reactive power source of oscillating signals;
   first and second converter circuits having the inputs thereof connected to said reactive power source, said second converter circuit being set to draw a reactive input current having a phase angle opposite to that of the reactive input current drawn by said first converter circuit; and
   control means to cause said first and second converter circuits to produce output currents representative of identical power capabilities.

2. A static power conversion arrangement as claimed in claim 1 wherein:
   said first converter circuit is a naturally commutated converter having a lagging reactive input current; and
   said second converter circuit is a force commutated converter set to have a leading reactive input current, the input reactive currents to said naturally commutated converter and said force commutated converter cancelling each other so that said reactive power source need not supply reactive power at the fundamental frequency.

3. A static power conversion arrangement as calimed in claim 2 wherein:
the output of said naturally commutated converter is connected to a first electrical system; and
the output of said force commutated converter is connected to another electrical system, power being transferred from one electrical system to the other without said reactive power source having to provide reactive power at the fundamental frequency.

4. A static power conversion arrangement as claimed in claim 2 wherein:
said naturally commutated converter is a naturally commutated cycloconverter having its output connected to an inductor; and
said force commutated converter is a force commutated cycloconverter having its output connected to said inductor, the signals from said cycloconverters being combined to provide reactive power to a supply of alternating current electrical power without said reactive power source having to provide any reactive power at the fundamental frequency.

5. A static power conversion arrangement comprising:
a reactive power source of oscillating signals;
first and second converter circuits having the inputs thereof connected to said reactive power source, said first and second converter circuits being connected in parallel between said reactive power source and a supply of electrical power; and
control means to cause said first and second converter circuits to supply output currents that result in variations in the total reactive current provided by said reactive power source being minimized.

6. A static power conversion arrangement as claimed in claim 5 wherein:
said first and second converter circuits are naturally commutated cycloconverters;
the electrical power supply supplies alternating current power; and
said control means causes each of said cycloconverters to produce an output current such that when it is combined with the output current of the other cycloconverter the variation in the reactive current drawn from said reactive power source is minimized.

7. A static power conversion arrangement as claimed in claim 5 and further comprising third and fourth converter circuits connected in parallel between said reactive power source and another supply of electrical power, the inputs of said third and fourth converter circuits connected to said reactive power source, and said control means causing the output currents of said converter circuits to be adjusted to provide the requisite current to the electrical power supplies while minimizing the variations in the reactive currents provided by said reactive power source.

8. A static power conversion arrangement employed to supply reactive power to a supply of alternating current electrical power and comprising:
a passive source of oscillating signals;
first and second cycloconverter circuits connected in parallel between said passive source and the alternating current electrical power supply; and
control means causing said first and second converters to produce output currents that may be combined to provide the desired current flow with respect to the power supply while minimizing the variations in the reactive power drawn from said passive source.

9. A static power conversion arrangement as claimed in claim 8 wherein:
said first and second cycloconverter circuits are naturally commutated cycloconverters; and
said control means causes said first and second cycloconverters to produce output currents having leading or lagging phases, as required, which may be combined to keep the total reactive input current required by said cycloconverters substantially constant.

10. A static power conversion arrangement as claimed in claim 8 wherein:
said first cycloconverter circuit is a naturally commutated cycloconverter having a lagging input power factor;
said second cylcoconverter circuit is a force commutated cycloconverter set to have a leading input power factor equal in magnitude to the lagging input power factor of said naturally commutated cycloconverter; and
said control means causes each of said cycloconverters to provide one half of the reactive power required by the supply of electrical power so that the reactive input currents cancel each other and said passive source need not supply any reactive power.

11. A static power conversion arrangement employed to supply reactive power to an alternating current electrical power supply comprising:
a passive tuned circuit to provide a source of oscillating signals;
a naturally commutated cycloconverter circuit having its input connected to said tuned circuit and its output connected to the alternating current power supply said naturally commutated cycloconverter having a lagging input power factor;
a force commutated cycloconverter circuit connected in parallel with said naturally commutated cycloconverter circuit with its input connected to said tuned circuit and its output connected to the alternating current supply of power, said force commutated cycloconverter arranged to have a leading input power factor equal to the lagging input power factor of said naturally commutated cycloconverter;
an inductor connected between the outputs of said cycloconverters and the electrical power supply; and
control means to cause each of said naturally commutated cycloconverter and said force commutated cycloconverter to provide one half of the reactive current required by the alternating current electrical power supply so that the reactive input currents to said cycloconverters cancel and eliminate reactive loading of said tuned circuit.

12. A static power conversion arrangement employed to transfer power from one alternating current system to another comprising:

a passive tuned circuit to provide a source of alternating current signals;

a naturally commutated cycloconverter circuit having its input connected to said tuned circuit and its output connected to one of the alternating current systems, said naturally commutated cycloconverter having a lagging input power factor;

a force commutated cycloconverter having its input connected to said tuned circuit and its output connected to the other alternating current system, said force commutated cycloconverter arranged to have a leading input power factor equal to the lagging output power factor of said naturally commutated cycloconverter; and control means to cause said naturally commutated cycloconverter and said force commutated cycloconverter to produce output signals at the frequency of the respective alternating current system to which each is connected and at identical real and reactive power levels so that the reactive input currents to said cycloconverters cancel to eliminate reactive loading of said tuned circuit.

13. A static power conversion arrangement employed to supply reactive power to an alternating current electrical power supply comprising:

a passive tuned circuit to provide a source of oscillating signals;

a pair of naturally commutated cycloconverter circuits connected between said tuned circuit and the alternating current power supply, the inputs of said cycloconverters being connected to said tuned circuit; and control means to cause each cycloconverter to produce an output current that when combined with the output current of the other cycloconverter provides the requisite reactive current to the alternating current power supply while varying to the smallest extent possible the input current that must be supplied by said tuned circuit, thus reducing reactive loading effects on said tuned circuit.

14. A static power conversion arrangement employed to transfer power from one alternating current system to another comprising:

a passive tuned circuit to provide a source of alternating current signals;

a first pair of naturally commutated cycloconverter circuits connected in parallel between said tuned circuit and one of the alternating current systems, the inputs of said cycloconverters being connected to said tuned circuit;

a second pair of naturally commutated cycloconverter circuits connected in parallel between said tuned circuit and the other alternating current systems, the inputs of said converters being connected to said tuned circuit; and control means to cause each cycloconverter in each of said pairs of cycloconverters to produce an output current that when combined with the output current of the other cycloconverter in that pair will provide the requisite current flow with respect to the associated alternating current system while varying to the smallest extent possible the reactive input current that must be supplied by said tuned current.

15. A method of supplying reactive power to an alternating current system utilizing a passive source to provide input signals to first and second cycloconverters connected in parallel between passive source and the alternating current system comprising:

setting the cycloconverters to produce output voltages having the frequency and magnitude required by the alternating current system; and controlling the reactive currents supplied by each of the cycloconverters to minimize variations in the reactive current drawn by the cycloconverters from the passive source.

16. A method as claimed in claim 15 wherein:

the cycloconverters are set to draw reactive input currents having opposite phase angles; and said controlling step comprises adjusting the cycloconverters to each convey one half of the supplied reactive power, thus establishing the same magnitude reactive currents to the inputs of the cycloconverters, the reactive currents of the same magnitude but opposite phase cancelling each other so that the passive source need not provide any reactive power.

17. A method as claimed in claim 15 wherein:

the cycloconverters draw reactive input currents having the same phase angle; and said controlling step comprises adjusting the cycloconverters to produce output currents having either leading or lagging phase angles, as required, to be combined in such a fashion as to minimize variations in the reactive input currents, and hence the reactive current supplied by the passive source.

18. A method of transmitting electrical power between two electrical systems, in which a passive source produces input signals for two converter arrangements connected in series between the two systems, comprising:

setting one converter arrangement to produce an output having the frequency of a first one of said electrical system and to convey the power being transmitted between the systems;

setting the other converter arrangement to produce an output having the frequency of the other electrical system and to convey the power being transmitted between the systems; and controlling the reactive currents provided at the outputs of the converter arrangements to minimize variations in the reactive currents supplied by the passive source.

19. A method as claimed in claim 18 wherein:

each of the converter arrangements is set to draw a reactive input current having a phase angle opposite to that of the reactive current drawn by the other converter arrangement; and said controlling step comprises adjusting each of the converter arrangements to produce reactive output currents having the same magnitude in order to draw input currents having the same magnitude which cancel each other as a result of the opposite phase angles, thus insuring that the passive source need not supply any reactive power.

20. A method as claimed in claim 18 wherein:

each of the converter arrangements comprises two converters in parallel, all of the converters drawing reactive input currents having the same phase angle; and said controlling step comprises adjusting each of the converters in a converter arrangement to produce reactive output currents to be combined in such a fashion as to minimize variaions in the combined reactive input currents, and hence the reactive current supplied by the passive source.

21. A static power conversion arrangement comprising:
- a reactive power source comprising an inductive-capacitive tuned circuit;
- first and second converter circuits having the inputs thereof connected to said reactive power source; and
- control means to cause said first and second converter circuits to supply output currents that result in variations in the total reactive current provided by said reactive power source being minimized.

22. A static power conversion arrangement comprising:
- a reactive power source of oscillating signals;
- first and second converter circuits having the inputs thereof connected to said reactive power source;
- an inductor connected to the outputs of said first and second converter circuits respectively; and
- control means to cause said first and second converter circuits to supply output currents that result in variations in the total reactive current provided by said reactive power source being minimized.

* * * * *